US010817402B2

(12) United States Patent
Huici et al.

(10) Patent No.: US 10,817,402 B2
(45) Date of Patent: Oct. 27, 2020

(54) METHOD AND SYSTEM FOR AUTOMATED BUILDING OF SPECIALIZED OPERATING SYSTEMS AND VIRTUAL MACHINE IMAGES BASED ON REINFORCEMENT LEARNING

(71) Applicant: NEC Laboratories Europe GmbH, Heidelberg (DE)

(72) Inventors: Felipe Huici, Dossenheim (DE); Simon Kuenzer, Waghaeusel (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/860,681

(22) Filed: Jan. 3, 2018

(65) Prior Publication Data

US 2019/0205241 A1 Jul. 4, 2019

(51) Int. Cl.

*G06F 11/36* (2006.01)
*G06F 8/61* (2018.01)
*G06N 20/00* (2019.01)
*G06F 9/455* (2018.01)

(52) U.S. Cl.

CPC ............ *G06F 11/3612* (2013.01); *G06F 8/63* (2013.01); *G06F 9/45541* (2013.01); *G06N 20/00* (2019.01)

(58) Field of Classification Search

CPC ...... G06F 8/63; G06F 11/3612; G06N 99/005
USPC .................................................. 717/124–135
See application file for complete search history.

(56) References Cited

U.S. PATENT DOCUMENTS 7,707,131 B2 4/2010 Chickering et al.
9,013,634 B2 * 4/2015 Agarwala ............... G06T 5/005 348/701
9,043,785 B1 * 5/2015 Suit ......................... G06F 9/505 709/224
9,448,826 B2 * 9/2016 Banerjee ............. G06F 9/45533
2006/0123412 A1 * 6/2006 Hunt ......................... G06F 8/61 717/174
2010/0058334 A1 * 3/2010 Mohindra ............. G06F 9/5077 718/1

(Continued)

FOREIGN PATENT DOCUMENTS

CN 106775956 A 5/2017
WO WO 2017134490 A1 8/2017

OTHER PUBLICATIONS

"Machine learning," Wikipedia, Dec. 28, 2017, last retrieved from https://en.wikipedia.org/w/index.php?title=Machine_learning&oldid=817402244 on Aug. 22, 2018. (Year: 2017).*

(Continued)

*Primary Examiner* — Andrew M. Lyons
(74) *Attorney, Agent, or Firm* — Leydig, Voit & Mayer, Ltd.

(57) ABSTRACT

Methods and systems for building an optimized image for an application are provided. An operating system is decomposed into granular modules. An initial configuration file to a build system is provided. The build system builds an initial image including initial modules for the application based on the initial configuration file. A monitoring system monitors performance indicators for the initial image. Using a machine learning algorithm, a subsequent configuration file based on the performance indicators is derived. The build system, builds a subsequent image for the application.

13 Claims, 3 Drawing Sheets

(56) References Cited

U.S. PATENT DOCUMENTS

2010/0199267 A1* 8/2010 Rolia .................... G06Q 10/06 717/135
2011/0302580 A1* 12/2011 Iikura .................... G06F 8/63 718/1
2012/0089825 A1* 4/2012 Jung .................... G06F 9/4418 713/2
2012/0303559 A1* 11/2012 Dolan .................... G06N 20/00 706/12
2012/0310870 A1* 12/2012 Caves .................... G06F 11/3688 706/14
2013/0073883 A1* 3/2013 Vick .................... G06F 1/32 713/320
2014/0019811 A1* 1/2014 Bordawekar ....... G06F 11/3409 714/47.1
2014/0047095 A1* 2/2014 Breternitz ............ G06F 9/5072 709/224
2014/0101430 A1* 4/2014 Bennah .................... G06F 8/63 713/100
2014/0172783 A1* 6/2014 Suzuki .................... G06F 8/63 707/609
2015/0169291 A1* 6/2015 Dube .................... G06F 8/61 717/101
2015/0242237 A1* 8/2015 Spivak .................... G06F 9/5055 718/1
2016/0110657 A1* 4/2016 Gibiansky ............. G06N 20/00 706/12
2016/0162783 A1* 6/2016 Tan .................... H04W 24/02 706/13
2016/0165462 A1* 6/2016 Tan .................... H04W 24/02 370/254
2017/0155724 A1 6/2017 Haddad et al.
2017/0249164 A1* 8/2017 Petkov ................ G06F 12/1009
2017/0351868 A1* 12/2017 Jacob .................... G06F 8/65
2018/0025160 A1* 1/2018 Hwang ................ G06F 21/577 726/25
2018/0082210 A1* 3/2018 McCord ................ G06N 7/005
2018/0159727 A1* 6/2018 Liu .................... H04L 41/145
2018/0191867 A1* 7/2018 Siebel .................... G06Q 10/06
2018/0218276 A1* 8/2018 Suman .................. G06N 20/00
2018/0225588 A1* 8/2018 Khidekel .............. G06N 7/005
2019/0012200 A1* 1/2019 Wilkerson ........... G06F 9/4881
2019/0042297 A1* 2/2019 Connor .............. G06F 9/45558
2019/0065221 A1* 2/2019 Chauhan ................ G06F 9/455
2019/0102204 A1* 4/2019 Khosrowpour ....... G06F 9/4451
2019/0138287 A1* 5/2019 De Capoa ................ G06F 8/64
2019/0171438 A1* 6/2019 Franchitti .............. G06N 5/022
2019/0312800 A1* 10/2019 Schibler .............. H04L 41/0823
2019/0327501 A1* 10/2019 Walters ............. H04N 21/8153

OTHER PUBLICATIONS

D. Jeswani, R. Balani, A. Verma and K. Bhattacharya, "Morpheus: Learning configurations by example," 2013 IFIP/IEEE International Symposium on Integrated Network Management (IM 2013), Ghent, 2013, pp. 76-84. (Year: 2013).*
Ilias Marinos, et al., "Network Stack Specialization for Performance", SIGCOMM'14, Aug. 17-22, 2014, pp. 1-12.
Anil Madhavapeddy, et al., "Unikernels: Library Operating Systems for the Cloud", ASPLOS'13, Mar. 16-20, 2013, pp. 1-12.
Joao Martins, et al., "ClockOS and the Art of Network Function Virtualization", Proceedings of the 11$^{th}$ ISENIX Symposium on Networked Systems Design and Implementation (NSDI'14), Apr. 2-4, 2014, pp. 1-16.
Filipe Manco, et al., "My VM is Lighter (and Safer) than your Container", SOSP, Oct. 28-31, 2017, pp. 1-17.
"Mini-OS", Nov. 3, 2017, p. 1.

* cited by examiner

METHOD AND SYSTEM FOR AUTOMATED BUILDING OF SPECIALIZED OPERATING SYSTEMS AND VIRTUAL MACHINE IMAGES BASED ON REINFORCEMENT LEARNING

FIELD

The present invention relates to methods and systems for building efficient, high performance, specialized operating systems and virtual machine images for optimizing the performance of a single application.

BACKGROUND

Specialization of applications, network I/O frameworks and subsystems, and operating systems can lead to performance benefits. In some cases, specialization can yield large gains in performance (e.g., an order of magnitude) compared to standard, general-purpose operating systems (OSes) and network subsystems.

For example, recently unikernels have been useful in providing performance benefits for applications. Unikernels are generally custom virtual machines (VMs) targeting a single application and based on a minimalistic OS. Unikernels may provide a reduction in the computer resources needed to run an application. For example, Unikernels may provide memory footprints of kilobytes (KBs) or a few megabytes (MBs), boot times of a few milliseconds and the ability to run thousands of instances on a single, inexpensive server. Further unikernels maintain a high level of computer security, unlike other solutions such as containers.

The efficiency gains of specialized operating systems are not limited to unikernels. In a wide range of fields such as IoT, embedded devices and the automotive industry systems can be optimized down to a minimum in order to achieve more efficient performance.

However, creating a specialized, minimalized operating system, such as a unikernel can be time consuming. In addition to actually porting a specific application to the underlying minimalistic OS, it must be determined which parts of the OS and its libraries to use to obtain improved application performance. This process of deciding which part of the OS and its libraries to include is a manual, time-consuming and difficult task.

Adding to the difficulty of creating a unikernel, these specialized images typically do not have the rich set of debugging and performance profiling tools that general-purpose OSes such as Linux have (e.g., gdb, perf, etc.). Thus, there is a difficult choice between obtaining the best application performance at significant development time and cost or compromising on application performance but requiring less development time and cost.

SUMMARY

In some embodiments, a method for building an optimized image for an application is provided. An operating system is decomposed into granular modules. An initial configuration file to a build system is provided. The build system builds an initial image including initial modules for the application based on the initial configuration file. A monitoring system monitors performance indicators for the initial image. Using a machine learning algorithm, a subsequent configuration file based on the performance indicators is derived. The build system, builds a subsequent image for the application.

In another embodiment, a computing system comprising one or more processors which, alone or in combination, are configured to provide for performance of the following steps is provided. An operating system is decomposed into granular modules. An initial configuration file to a build system is provided. The build system builds an initial image including initial modules for the application based on the initial configuration file. A monitoring system monitors performance indicators for the initial image. Using a machine learning algorithm, a subsequent configuration file based on the performance indicators is derived. The build system, builds a subsequent image for the application.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
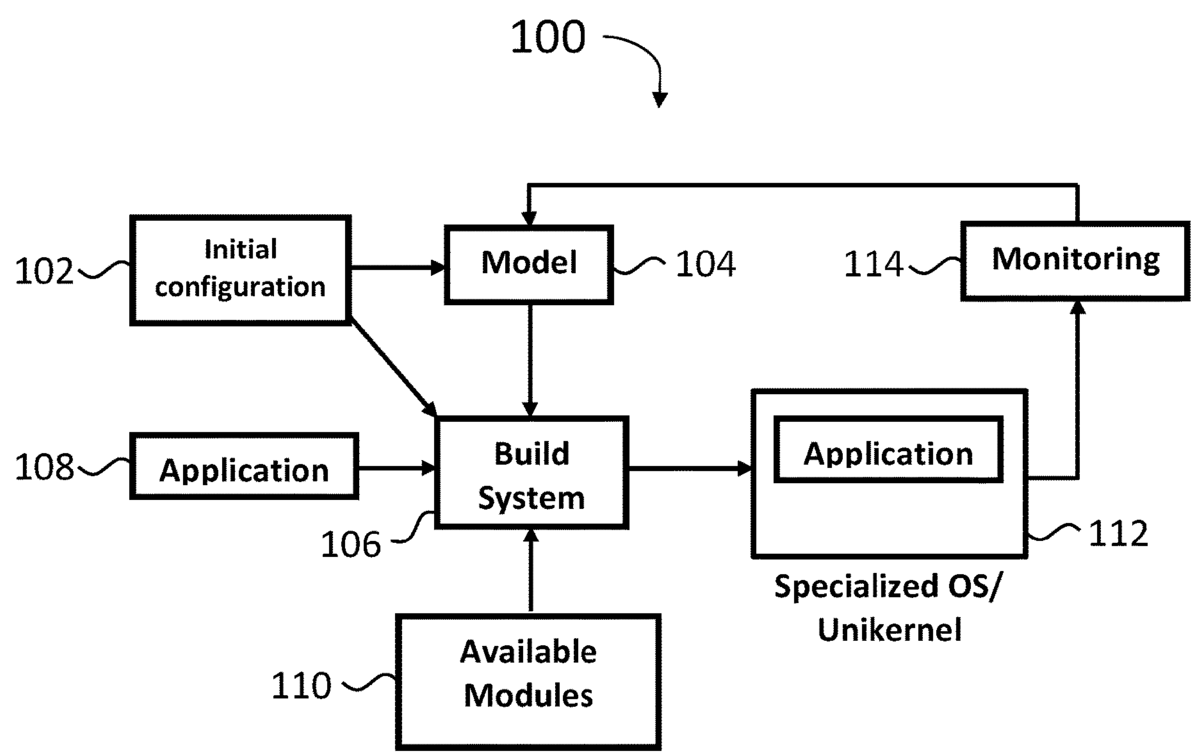
FIG. 1 illustrates a system diagram of a computing environment for building a specialized operating system according to an embodiment.

A problem unique to computer networks and solved by embodiments of the present invention is to efficiently build a specialized operating system, such as a unikernel. Embodiments provide methods to build efficient, high performance, specialized operating systems and virtual machine images (VMs or images) targeted at optimizing the performance of a single application. In some embodiments, an algorithm, such as a reinforcement learning machine learning algorithm, uses measurements from a set of performance indicators for an image as the image runs. The performance indicators are fed into a model for creating a specialized operating system. The model may be based on heuristics or other advanced techniques such as a deep neural network. The model then generates a new configuration for creating an optimized specialized operating system. This process of creating an optimized specialized operating system based on performance indicators for the image of the previously generated optimized specialized operating system can be performed repeatedly. In this way, the performance of the optimized specialized operating system can be iteratively improved. After a certain number of rounds the system generates an automatically optimized specialized operating system image. In this way, the performance of a computing system can be improved while minimizing development time and not comprising on application performance.

In an embodiment, the invention provides a method that iteratively measures the performance of a specialized OS image (image) and uses that information to drive a model that intelligently builds subsequent, better optimized versions of the image. A specialized OS or specialized OS image is a binary that may consist of a single application and an operating system tailored to the specific needs of that application. The image is meant to run "bare-metal." That is the image is intended to run on a processor architecture, such as x86 or ARM without being run in a host operating system.

In alternative embodiments, the image may be run within a host operating system, such as Linux. For example, a unikernel is a virtual machine image that can run in a virtualization platform such as Xen or KVM (Kernel-based Virtual Machine).

A build system is a tool used to build a runnable binary image using source code and a configuration. The tool can be, for instance, be based on the "make" tool and use Makefiles. In one embodiment, a build system can build a specialized OS or unikernel based on a configuration file and source code for the operating system or unikernel. The terms "image" and "specialized image" refer to both a specialized OS image and a unikernel.

Embodiments of the system provide improved security since the Trusted Compute Base (TCB) of the unikernels is very small and thus the attack is surface minimized. Additionally, unikernels tend to reduce the number of typical attack vectors such as shells. Further, for safety-critical domains such as automotive, aerospace and industrial application (to name a few), certification can be done more efficiently and at less cost because the number of lines of code in a unikernel is smaller than a full operating system.

FIG. 1 illustrates a system diagram for a computing environment 100 for building an image according to an embodiment. The system uses an algorithm, for example a reinforcement learning algorithm, to drive a process that iteratively measures the performance of a specialized image and uses that information to drive a model that intelligently decides how to build subsequent, better performing versions of the image by selecting which components of the OS and libraries to use, and how to configure them.

In some embodiments, the system begins with a valid initial configuration 102 for building an image. For instance, the configuration 102 could be a combination of modules (e.g., Linux kernel modules), libraries and/or services that a target application 108 needs in order to run. Additionally, the configuration 102 includes parameters for the modules, libraries and/or services. This initial configuration 102 is provided to the build system 106. The initial configuration can be created manually by, for example, a software engineer. In some embodiments, a tool derives the configuration automatically by looking at the symbols (i.e., functions) that a particular application depends on and matching those to symbols provided by the various libraries available in the system.

Additionally, the system may provide the configuration 102 to a model 104 that tracks the configuration of images over time. Additionally, as further discussed below, the model may track metrics relating to an images performance. The metrics may also be tracked over time. As further described below, the model 104 is used to generate new configuration files used to build new versions of an image. The model 104 can be based on heuristics. In alternative embodiments, the model 104 uses advanced machine learning methods, such as a deep neural network or reinforcement learning.

Based on the initial configuration, the build system 106 builds an image 112 including the desired application 108. The build system builds the image using available modules 110, libraries and/or services. In some embodiments, an operating system, such as Linux is decomposed into fine-granularity modules. These fine-granularity modules make up the modules 110. In some embodiments, the operating system is decomposed manually. For instance, the system may consider the file or files that implement a co-operative scheduler, remove the parts that are needed, modify some of the functionality, optimize some of it and then add it to the system by making the scheduler conform to a common API.

The system uses the monitoring system 114 to gather key performance indicators (KPIs) to assess the performance of the image 112 including the application 108. Examples of KPIs (or metrics) are throughput, memory consumption, boot time or delay, and other performance metrics.

The KPIs are measured by monitoring system 114 and fed back to the model 104. The monitoring system 114 can use various methods and tools (e.g., network monitoring software, performance tools on Linux, switch or router stats, etc.) to gather the KPIs. The monitoring system 114 can gather network performance, CPU performance, memory performance and other desired performance metrics.

The model 104 correlates the KPI measurements with the configuration from the running image 112. Initially, the configuration is based on the initial configuration 102. However, as the system runs, the model 104 may generate new configurations to optimize the image 112. Based on the KPIs and the configuration for the currently running image 112, the model takes an action, such as creating a new configuration or re-configuring a running image with potentially different modules and different parameters for the modules. In this way, the model 104 may iteratively improve the performance of the image 102 over time. The new configuration from the model 104 is then fed to the build system 106.

The model 104 uses a heuristic or machine learning technique (e.g., reinforcement learning) to drive the configuration and building of specialized operating systems and unikernels. In some embodiments, a heuristic may try all libraries of a category (e.g., all available schedulers), measure a defined set of KPIs (e.g., CPU utilization) and choose the library that results in the best KPI results. The heuristic could then repeat for other categories (e.g., memory allocators).

Building the image 112 by the build system 106, gathering KPIs by the monitoring system 114 and generating a new configuration based on the previous configuration and the KPIs by the model 104 constitute a round. The process is repeated until a desired level of performance is obtained from the image. The desired level of performance can be determined by a threshold for a KPI or KPIs, or by stopping the process once N rounds have taken place where the measured KPI hasn't improved by more than a set number of percentage points with respect to previous rounds.

The process above can be used with a variety of operating systems, including Linux. The described embodiments can also be extended to include more granular modules by decomposing an operating system. For example, a minimalistic OS such as MiniOS can be used with fine-granularity libraries (e.g., a scheduler, memory allocator, a network protocol, etc.). This fine granularity would provide greater choice for the model (i.e., many more modules are available), resulting in greater opportunities for optimization.

Figure 2:
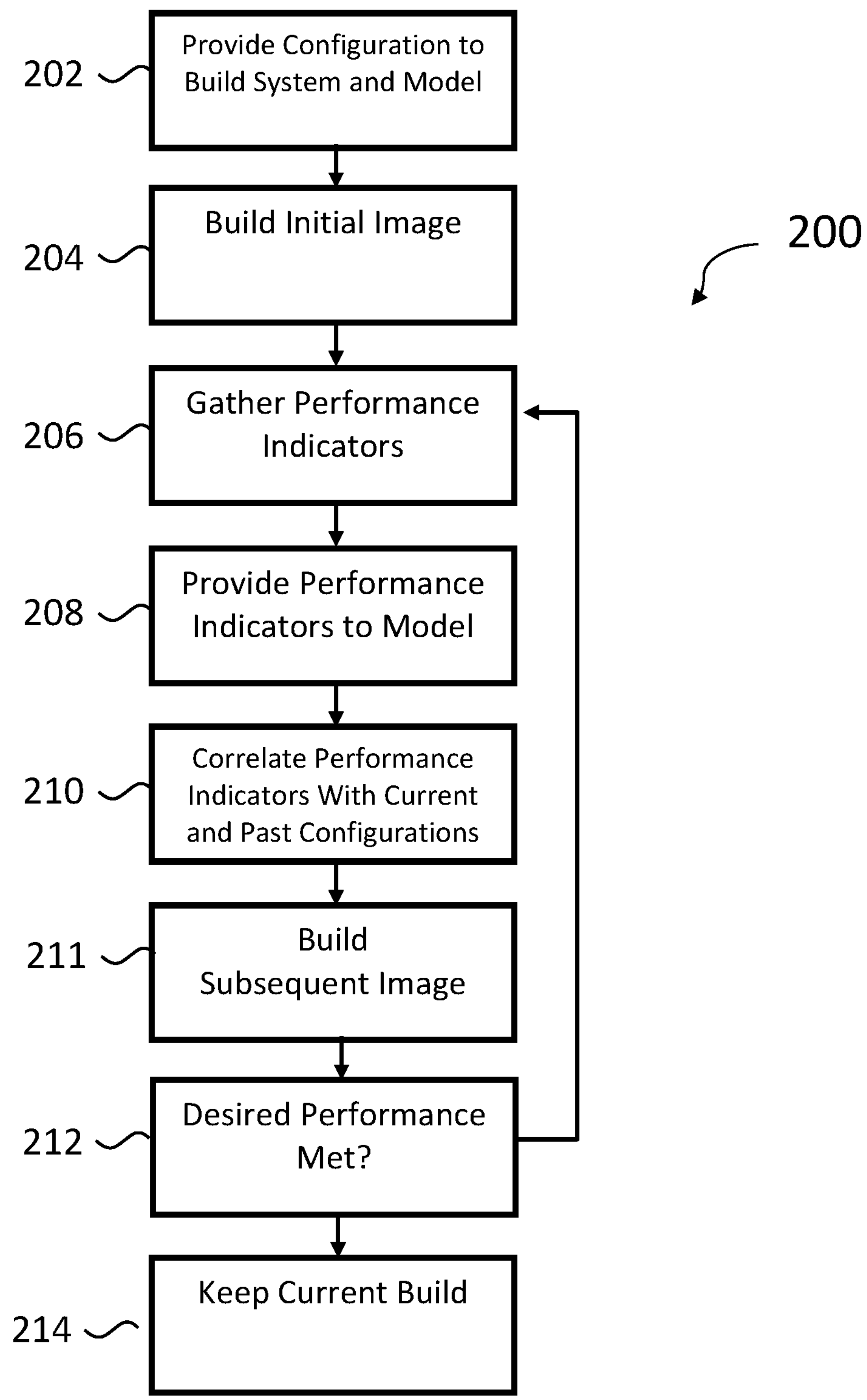
FIG. 2 is a flow diagram illustrating a process for building a specialized operating system according to an embodiment.

FIG. 2 is a flow diagram illustrating a process 200 for building a specialized operating system according to an embodiment. At step 202, the system provides an initial configuration to a build system and a model.

At step 204 the system builds an image. For example, as described above, the build system 106 can build an image 112 for an application 108 using an initial configuration 102.

At step 206, performance indicators for the image are gathered. In one embodiment, as described above, monitoring system 114 gathers KPIs from the image 112.

At step 208, the performance indicators, such as KPIs, are provided to the model. At step 210, the performance indicators are correlated with the image they were gathered from. In some embodiments, the model performs the correlation of performance indicators with the image they were gathered from. At step 211, the system builds the subsequent image based on the correlation of performance indicators with the current and past configurations.

At step 212, the system determines whether the desired performance has been met. The desired level of performance can be determined by a threshold for a KPI or KPIs, or by stopping the process once N rounds have taken place where the measured KPI hasn't improved by more than a set number of percentage points with respect to previous rounds. If the desired level of performance has been met, the system keeps the current image build at step 214.

If the desired level of performance has not been met, at step 212 the model takes an action, such as generating a new configuration file. The new configuration file includes potentially different modules and different parameters for the modules then the previous image included. The process then returns to step 202. At step 202 a new image is built based on the new configuration file. Thereafter, the process continues as described above.

Figure 3:
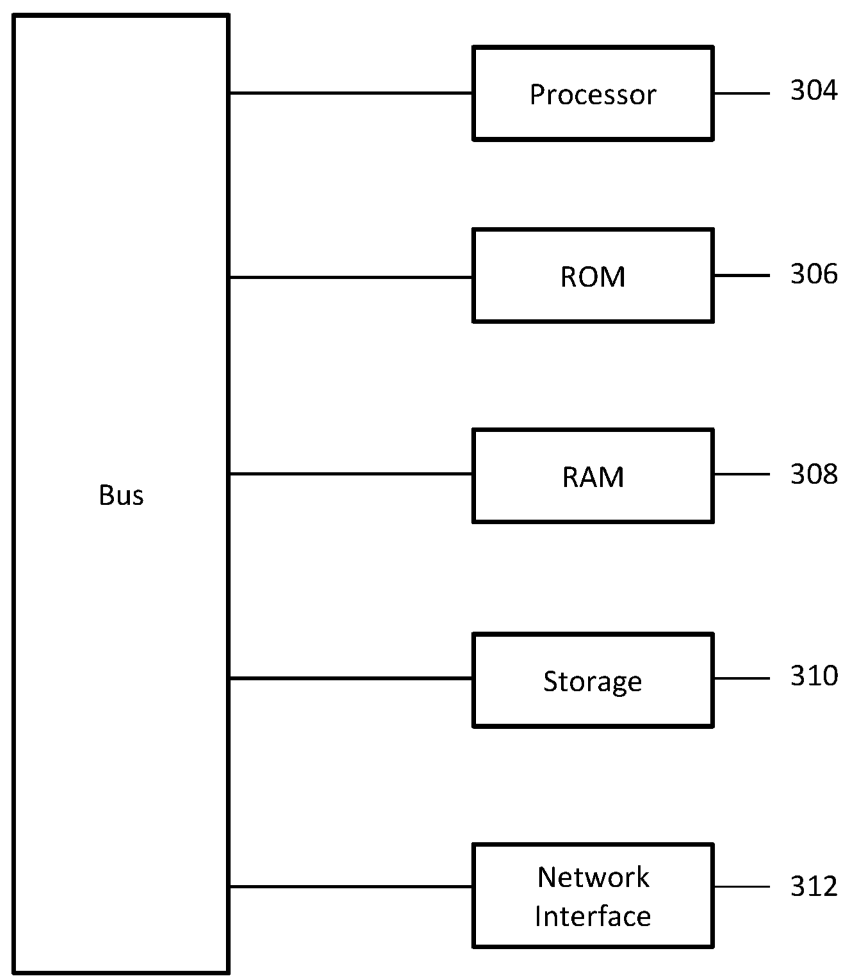
FIG. 3 is a block diagram of a processing system according to one embodiment.

FIG. 3 is a block diagram of a processing system according to one embodiment. The processing can be used to implement the computing systems and processes described above. The processing system includes a processor 304, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 310, which may be a hard drive or flash drive. Read Only Memory (ROM) 306 includes computer executable instructions for initializing the processor 304, while the random-access memory (RAM) 308 is the main memory for loading and processing instructions executed by the processor 304. The network interface 312 may connect to a wired network or cellular network and to a local area network or wide area network, such as the internet.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for building an optimized image for an application, the method comprising:

decomposing an operating system into granular modules;

deriving an initial configuration file based on a plurality of symbols that the application depends on, wherein the initial configuration file includes a first library selected from a plurality of libraries in a first category in a plurality of categories;

providing the initial configuration file to a build system;

building, by the build system, an initial image including initial modules for the application based on the initial configuration file;

gathering, by a monitoring system, performance indicators for the initial image, the performance indicators including CPU performance, network throughput, memory consumption, and boot time, wherein at least one performance indicator is obtained from a network switch;

deriving, using a machine learning algorithm, a subsequent configuration file based on the performance indicators; and building, by the build system, a subsequent image for the application;

performing, repeatedly until a desired level of the performance indicators is reached, the following steps:

gathering, by a monitoring system, performance indicators for the subsequent image;

deriving, using a machine learning algorithm, a revised configuration file based on the performance indicators, wherein the revised configuration files includes a subsequent library selected from the plurality of libraries in the first category; and building, by the build system, a revised subsequent image for the application, wherein the desired level of performance is reached after a predetermined number of repetitions have taken place where the measured performance indicators, including CPU performance, network throughput, memory consumption, and boot time haven't improved by more than a set number of percentage points with respect to previous repetitions and all libraries in the first category have been selected.

2. The method of claim 1, further comprising:

correlating the performance indicators with the subsequent image the performance indicators were gathered from.

3. The method according to claim 1 further comprising running the subsequent image.

4. The method according to claim 1, wherein the subsequent image is a unikernel.

5. The method according to claim 1, wherein the subsequent image is a specialized operating system image.

6. The method according to claim 1, wherein the initial image and the subsequent image are a unikernel.

7. The method according to claim 1, wherein the initial image and the subsequent image are a specialized operating system image.

8. The method according to claim 1, wherein the step of gathering, by a monitoring system, performance indicators further comprises:

gathering at least one of network performance, CPU performance, and memory performance.

9. The method according to claim 1, further comprising correlating the performance indicators with the initial image.

10. The method according to claim 1, further comprising running the initial image.

11. The method according to claim 1, further comprising running the subsequent image.

12. A computing system comprising one or more processors which, alone or in combination, are configured to provide for performance of the following steps:

decomposing an operating system into granular modules;

deriving an initial configuration file based on a plurality of symbols that the application depends on, wherein the initial configuration file includes a first library selected from a plurality of libraries in a first category in a plurality of categories;

providing the initial configuration file to a build system;

building, by the build system, an initial image including initial modules for the application based on the initial configuration file;

gathering, by a monitoring system, performance indicators for the initial image, the performance indicators including CPU performance, network throughput, memory consumption, and boot time, wherein at least one performance indicator is obtained from a network switch;

deriving, using a machine learning algorithm, a subsequent configuration file based on the performance indicators, wherein the revised configuration files includes a subsequent library selected from the plurality of libraries in the first category; and building, by the build system, a subsequent image for the application;

performing, repeatedly until a desired level of the performance indicators is reached, the following steps:

gathering, by a monitoring system, performance indicators for the subsequent image;

deriving, using a machine learning algorithm, a revised configuration file based on the performance indicators; and building, by the build system, a revised subsequent image for the application, wherein the desired level of performance is reached after a predetermined number of repetitions have taken place where the measured performance indicators, including CPU performance, network throughput, memory consumption, and boot time haven't improved by more than a set number of percentage points with respect to previous repetitions and all libraries in the first category have been selected.

13. The computing system according to claim 12, wherein the subsequent image is a unikernel.

* * * * *